June 26, 1928.

W. L. GOMORY 1,675,173

HEADER OR COUPLING

Filed Feb. 10, 1922

INVENTOR
William L. Gomory,
BY
ATTORNEY

Patented June 26, 1928.

1,675,173

UNITED STATES PATENT OFFICE

WILLIAM L. GOMORY, OF CHICAGO, ILLINOIS, ASSIGNOR TO STANDARD DEVELOPMENT COMPANY, A CORPORATION OF DELAWARE.

HEADER OR COUPLING.

Application filed February 10, 1922. Serial No. 535,436.

My invention relates more particularly to headers or coupling means whereby the ends of a plurality of differently disposed tubes or pipes are connected together in fluid-tight relation with each other, in order that a continuous flow of fluid through the respective pipe sections or tubes of a heater, still, boiler, or other tubular fluid-containing element may be conveniently and readily provided.

One object of my invention is to provide a construction whereby the adjacent ends of oppositely or differently disposed tubes or pipes may not only be readily connected together in fluid-tight relation, but which also permits easy and full access to be had to the interior of the connected tubes or pipes for cleaning; the header or coupling being so formed and provided with openings disposed in alignment with the respective ends of the tubes or pipes.

A further object of my invention is to provide a header wherein the closure members and the openings in the header may be provided with ground seats to produce fluid-tight joints; while the header or coupling, about the openings therein, is formed to ensure a proper seating of the closure members; the invention also involving means whereby the closure members are firmly held in place by regulable pressure-applying means which may not only be quickly applied but also readily released to permit removal of the closure members.

The objects and advantages of my invention will be more readily comprehended from the detailed description of the accompanying drawing, wherein:—

Figure 1:
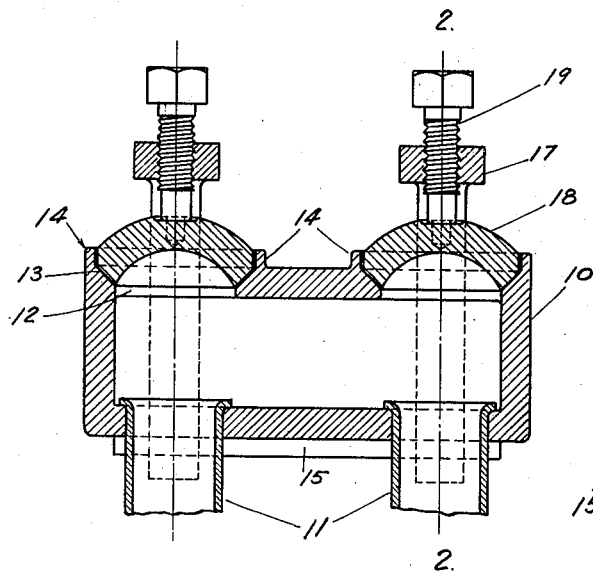
Figure 1 is a longitudinal sectional view of my improved header or coupling as applied to the ends of two tubes or pipes, of which only a portion is shown.

My improved header or coupling, while adapted to boilers and devices employing a series of tubes or pipes disposed in different directions, is more especially intended for use in connection with oil heating apparatus or the oil conveying tubes of furnaces and in the particular exemplification of the invention comprises a suitable header or hollow casting 10, which in this instance is of rectangular configuration, with one side wall thereof apertured to receive the ends of the tubes or pipes 11, which are suitably secured in place, as for example by expanding or otherwise; to provide fluid-tight joints; the header being hollow or chambered to permit communication between the different tubes or pipes connected with the header. The side wall of the header or casting opposite to the side which receives the respective tubes or pipe-ends and at points in direct alignment with the pipe-receiving openings, is provided with a corresponding number of openings as at 12. The openings 12 are preferably all provided with a tapered or beveled seat as at 13 which terminates at the outer surface in a circumferential rib or ridge 14 disposed entirely about the orifice or opening 12.

Figure 2:
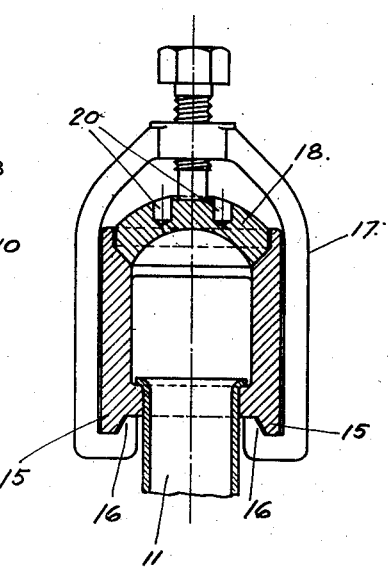
Figure 2 is a vertical sectional view, taken substantially on the line 2—2 of Figure 1.

The side wall of the header 10, which receives the tubes or pipes 11, is preferably provided with longitudinal ridges or ribs 15, 15 lengthwise of the opposite longitudinal sides; and the inner, opposing faces of the ribs preferably provided with a taper or bevel, as more clearly shown in Figure 2. The ribs 15 are adapted to receive the tapered bent ends or beveled hook portions 16 of a strap or yoke 17 which is adapted to straddle the header, as shown in Figure 2.

The orifice or opening 12 is adapted to receive a cap or closure member 18, which is preferably of the arcuate formation shown, while the perimeter thereof is beveled to correspond with the taper or bevel of the orifice 12 in the header 10, in order that the cap 18 may fit or come flush with the beveled seat 13 of the orifice 12. The cap 18 is also preferably formed so that a portion of the perimeter of the cap or closure member 18 is made to extend parallel with the flat or perpendicular surface of the continuous rib or flange 14. The outer surface of the cap or closure member 18 is shown provided with a slight socket or recess to receive the end of a screw or pressure-applying member 19 which extends through a tapped opening in the yoke or bracket member 17. As is apparent from the construction shown, the members or yokes 17 are slid lengthwise into place from the ends of the header or coupling 10, with the hooks or end portions 16 of the bracket member in engagement with the inner faces of the longitudinal ribs 15; the closure members or caps are then seated in place and the pressure-applying members or bolts 19 then screwed firmly into contact with the respective caps or closure members, thereby securely locking the caps or closure members in fluid-tight relation with the header or casting.

In return couplings or constructions as heretofore employed, screw-plugs were used to close the access openings and these plugs, after the heater or still had been in use, became gummed or corroded, necessitating considerable force and exertion to remove the plugs. The corrosion of the threads, as well as the frequent screwing of the plugs into and out of place, has resulted in the threads becoming torn or worn, which in frequent cases necessitated a replacement or renewal of the entire header or coupling, as well as resulting in serious accidents. With my invention, these difficulties are entirely eliminated; the loss of time prevented and a pressure resisting construction is provided.

In order that the caps or closure members may be easily removed and manipulated, I prefer to provide the outer surfaces thereof with the tool-receiving sockets indicated at 20, which permit the use of a suitable wrench or tool whereby to dislodge the cap or closure member and at the same time facilitate the grinding of the caps or closure members in place.

With my improved construction, where the access openings are surrounded by the ribs or flanges 14, it is apparent that proper seating of the caps or closure members is not only ensured, but any shifting or sidewise displacement of the closure members will be prevented; the ribs tending to properly center the closure members or caps, thereby ensuring the proper application of the pressure induced by the pressure-applying members 19.

I have shown what I believe to be the simplest embodiment of my invention, having described the same in terms employed merely as terms of description and not as terms of limitation, as structural modifications are possible and may be made without, however, departing from the spirit of my invention.

What I claim is:—

A header of the character described, comprising a hollow rectangular body, one side whereof is provided with tube-receiving openings while the opposite side is provided with openings aligned with the tube-receiving openings, the second mentioned openings having outwardly flared conical surfaces of comparative width terminating in annular flanges disposed about said openings and extending upwardly and parallel with the axes of the openings, closure members for the second mentioned openings, having inwardly and downwardly beveled perimeters corresponding in width with said conical flared surfaces and perpendicular cylindrical surfaces extending parallel with said flanges, yoke members adapted to straddle the body and to be disposed transversely of and in spaced relation with the closure members, the ends of the yoke members being bent inwardly and engaging with the tube-receiving side of the body, the yoke ends and body being formed with coacting gripping surfaces, and regulable pressure means threaded through the intermediate portions of the yoke members and engaging with the tops of the closure members.

WILLIAM L. GOMORY.